(12) United States Patent (10) Patent No.: US 12,568,959 B2
Sigvardsson et al. (45) Date of Patent: Mar. 10, 2026

---

(54) ORGAN PRESERVATION AND/OR PERFUSION SOLUTION

(71) Applicant: XVIVO PERFUSION AB, Gothenburg (SE)

(72) Inventors: Anne-Li Sigvardsson, Gothenburg (SE); Emilia Henriksson, Gothenburg (SE)

(73) Assignee: XVIVO PERFUSION AB, Gothenburg (SE)

( * ) Notice: Subject to any disclaimer, the term of this patent is extended or adjusted under 35 U.S.C. 154(b) by 582 days.

(21) Appl. No.: 18/002,773

(22) PCT Filed: Jul. 5, 2021

(86) PCT No.: PCT/EP2021/068529
§ 371 (c)(1),
(2) Date: Dec. 21, 2022

(87) PCT Pub. No.: WO2022/017763
PCT Pub. Date: Jan. 27, 2022

(65) Prior Publication Data
US 2023/0284612 A1 Sep. 14, 2023

(30) Foreign Application Priority Data
Jul. 23, 2020 (GB) ..................................... 2011427

(51) Int. Cl.
*A01N 1/126* (2025.01)
(52) U.S. Cl.
CPC .................................. *A01N 1/126* (2025.01)
(58) Field of Classification Search
CPC .... A01N 1/126; A61K 31/122; A61K 31/137; A61K 31/198; A61K 31/203; A61K 31/355; A61K 31/4045; A61K 31/4709; A61K 31/573; A61K 31/593; A61K 31/661
See application file for complete search history.

(56) References Cited

U.S. PATENT DOCUMENTS 10,176,887 B1 1/2019 Brassil et al.

FOREIGN PATENT DOCUMENTS

| | | | |
|---|---|---|---|
| CN | 102228016 A | 11/2011 | |
| CN | 110267534 A * | 9/2019 | ............ A61M 39/08 |
| CN | 110463687 A | 11/2019 | |
| WO | 0235929 A1 | 5/2002 | |
| WO | 2009121884 A1 | 10/2009 | |
| WO | 2016207335 A1 | 12/2016 | |
| WO | 2020111372 A1 | 6/2020 | |

OTHER PUBLICATIONS

Gonzalez N, et al</i> "A simple procedure for resolution of *Escherichia coli</i>* RNA polymerase holoenzyme from core polymerase" Arch. Biochem. Biophys.</i>, 1977, 182(2), pp. 404-408; doi: 10.1016/0003-9861(77)90521-5. (Year: 1977).*
Finamore et al., "Impact of high glucose concentraction on aspirin-induced acetylation of human serum albumin: an in vitro study"; EUPA Open Proteonomics, vol. 3, pp. 100-113, Jun. 1, 2014.
Search Report for International Application No. PCT/EP2021/068529 dated Sep. 28, 2021.

* cited by examiner

*Primary Examiner* — Aaron J Kosar
(74) *Attorney, Agent, or Firm* — EVENTIDE LAW LLC

(57) ABSTRACT

Serum albumin is an important molecule in human and animal blood. It provides oncotic pressure and acts as a transportation agent, delivering nutrients from the blood to the tissue and removing waste products from the tissue to the blood. This invention describes an organ preservation and/or perfusion solution which comprises acetylated serum albumin, as well as method of making and using such a solution, and uses of acetylated serum albumin itself. The acetylated serum albumin utilised in the present invention can protect the vascular endothelium during perfusion of an isolated organ or tissue.

18 Claims, 5 Drawing Sheets

ORGAN PRESERVATION AND/OR PERFUSION SOLUTION

FIELD OF THE INVENTION

Serum albumin is an important molecule in human and animal blood. It provides oncotic pressure and acts as a transportation agent, delivering nutrients from the blood to the tissue and removing waste products from the tissue to the blood. This invention describes an organ preservation and/or perfusion solution which comprises acetylated serum albumin, as well as methods of making and using such a solution, and uses of acetylated serum albumin itself. The acetylated serum albumin utilised in the present invention can protect the vascular endothelium during perfusion of an isolated organ or tissue.

BACKGROUND

Ex vivo organ perfusion (EVOP) is used to perfuse, preserve, evaluate and/or treat isolated organs or tissue from an organ donor, intended for transplantation. The system operates as a cardiopulmonary bypass system with at least one pump, an oxygenator, a heater/cooler and a reservoir. If the organ to be perfused ex vivo is a lung, additionally a ventilator is usually used. A perfusate is gassed to achieve near physiological blood gases in terms of oxygen and carbon dioxide and pumped through the organ or tissue to be perfused. Ex vivo organ perfusion, preservation, evaluation or treatment could be done on any vascularised organ or tissue for example lungs, heart, kidney, liver, pancreas, limbs and other tissue.

Another procedure that involves isolated perfusion is in vivo organ perfusion. In this case the organ or tissue to be treated is isolated through vasculature restriction through balloon technique or through other means to isolate the organ or tissue from the systemic circulation. Once isolated, the organ or tissue can be treated with cytostatic or other pharmaceuticals while avoiding systemic side effects.

STEEN Solution (see WO0235929A1) was developed to be used as a perfusate when evaluating lungs and other organs or tissues at normo- or near normothermic conditions. It is a solution with near physiological electrolyte concentrations, and it is based on serum albumin, dextran and glucose. STEEN Solution has mainly been used clinically for lung evaluation in the ex vivo lung perfusion (also termed EVLP) process. Two main protocols have arisen for the EVLP procedure, the Lund protocol and the Toronto protocol.

Both the Lund and Toronto protocols have been shown to be safe and effective, and have made hundreds of lungs available for transplantation. However, many lungs are not able to sustain longer periods of EVLP, and so become non-viable before transplantation to a suitable donor. Prolonged EVLP of more than 3 hours and up to at least 12 hours is important if the lungs are to be pharmacologically treated, and is also useful for logistical purposes. It is known that about 10 to 60% of the lungs put on EVLP, with the techniques used today, do not sustain EVLP and become discarded. Hence, there is a need to provide an organ perfusion solution that allows for stable perfused lungs and when needed, prolonged EVLP, especially prolonged EVLP at physiological pressures and flow of at least 75% of estimated cardiac output at rest. Reasons why lungs are being discarded while on EVLP could be because they become oedematous or because of increased vascular resistance resulting in low flow. A perfusion solution that is more protective of the vascular endothelium could reduce these negative effects and thereby increase safe turn-over of lungs on EVLP to transplantation. This would increase the likelihood of lungs being successfully transplanted, which would be hugely beneficial to patients needing transplants. A solution with such qualities would not only be beneficial for ex vivo lung perfusion, but for perfusion of any tissue or organ comprising vascular endothelium and/or for infusion of patients and would be a huge benefit to medical sciences.

SUMMARY OF THE INVENTION

According to a first aspect, the present invention relates to an organ preservation and/or perfusion solution, wherein the organ preservation and/or perfusion solution contains serum albumin which has been acetylated.

According to a second aspect, the present invention relates to a method of making an organ preservation and/or perfusion solution, the method comprising the steps of: (i) providing serum albumin; (ii) mixing the serum albumin with a solution containing electrolytes to form an organ preservation and/or perfusion solution, wherein the solution also contains an acetylating agent; and (iii) incubating the mixture, so that the serum albumin becomes acetylated.

According to a third aspect, the present invention relates to an organ preservation and/or perfusion solution obtainable by the method of the second aspect.

According to a fourth aspect, the present invention relates to the use of an organ preservation and/or perfusion solution according to the first aspect of the invention in isolated organ or tissue perfusion.

According to a fifth aspect, the present invention relates to a method of treatment for vascular complications of diabetes, cardiovascular disease, infectious diseases affecting the vasculature integrity, and/or acute respiratory distress syndrome in a patient in need thereof, involving the step of administering a solution containing acetylated serum albumin to the patient.

According to a sixth aspect, the present invention relates to a solution comprising acetylated serum albumin for use in the treatment of vascular complications of diabetes, cardiovascular disease, infectious diseases affecting the vasculature integrity, and/or acute respiratory distress syndrome.

According to a seventh aspect, the serum albumin is incubated with an acetylating agent which might then be removed through for example dialysis, resulting in an acetylated serum albumin, without remaining additives from the acetylating process.

According to an eighth aspect, the serum albumin is incubated with an acetylating agent which might then be removed through for example dialysis, before pasteurisation of the serum albumin resulting in an acetylated serum albumin that is stabilised during pasteurisation and during storage of the serum albumin before use.

Advantage of the Invention

The present invention relates to an organ preservation and/or perfusion solution containing serum albumin which has been acetylated, as well as methods of making and using such solutions, and the use of acetylated serum albumin itself. The present inventors have discovered that in vitro acetylation of serum albumin leads to important advantages, including protection of the vascular endothelium and reduced vasculature resistance in the perfused tissue, organ or body, compared to when a non-acetylated serum albumin is used. Acetylating the serum albumin also protects the serum albumin itself from degradation into damaging degradation products, both in the solution, and in the organ or body during use.

Glucose is an energy substrate that is important for perfusion of organs or tissues, and is usually included in organ preservation or perfusion solutions. However, when glucose is stored with serum albumin, a condensation reaction occurs between the carbonyl group in glucose and N-terminus and Lysine groups of the serum albumin, resulting in glycation. Following this reaction, a series of oxidative reactions are thought to occur destabilising the serum albumin and generating advanced glycation end products (also termed AGEs). AGEs are known to aggregate and to have negative effects on the vascular endothelium and should therefore be avoided in a perfusion solution required to protect the vascular endothelium. To reduce glycation, the glucose concentrations in organ preservation or perfusion solutions should be kept at normal physiological concentrations.

However, the present inventors utilise that glycation could also be reduced by use of co-incubation in the solution of an acetylating agent. This is thought to be because both glycation and acetylation occurs on N-residues and lysine residues on the serum albumin. When an acetylating agent is included with serum albumin and glucose in a solution, there will be competitive binding between the glucose and acetylating agent for the glycation and acetylation reactions, which reduces the level of glycation, in favour of acetylation. This advantageously mitigates the damaging effects of glycated serum albumin and instead provides vasoprotective effects to the serum albumin, including protecting the vascular endothelium and reducing vascular resistance, meaning that organs remain in a better condition during preservation and/or perfusion or other treatments, and can be preserved or perfused for longer. This, of course, means that the organs are available to a wider range of patients, which should allow an increase in the rate of organ transplantation.

Furthermore, acetylating the serum albumin protects the serum albumin from the destabilising effects of glycation, and reduces the generation of dangerous AGEs. The altered structure of acetylated serum albumin might also in itself provide vascular protective functions.

A previous publication, WO2016/207335, relates to methods of evaluating an organ during isolated organ perfusion by measuring a biomarker, which can be Tissue Factor (also termed TF). It is also suggested that TF suppressor molecules, including acetylsalicylic acid (also termed ASA or aspirin), can be added to a perfusion solution, at the time of perfusion, in response to an increase of cell injury biomarkers in the perfusion solution. Supplementation of a perfusion solution with ASA in this way would not provide the incubation required between the serum albumin and the ASA for the serum albumin to be acetylated, though, nor would it protect the serum albumin from being glycated between production and time of use.

In contrast, in the present invention the serum albumin is acetylated, which requires the serum albumin and acetylating agent to be incubated while the acetylation reaction occurs. The solution of the present invention is provided as a ready to use solution, such that it does not need to be further supplemented before use. The solution of the present invention can be sterilized, for example by aseptic filtration.

Accordingly, the solution of the present invention has the potential to maintain the vascular endothelium in a good condition for longer than previously possible, can help lungs that were damaged before perfusion, and could maintain more organs in a stable condition during perfusion and might provide for stable perfusion for at least 12 hours. The organ preservation and/or perfusion solution of the present invention could potentially actually improve the integrity of the vascular endothelium of the organ, compared to before perfusion. This has the advantage that many more organs could be available for transplantation than was previously the case. The improvement might also improve immediate post-transplantation function and/or circulation of the organ or tissue.

Maintaining and/or improving the vascular endothelium could for example be monitored as vascular resistance, oedema formation, or cell death. Cell death could, for example, be monitored as release of cell free DNA in the perfusate.

DETAILED DESCRIPTION

Serum Albumin

Serum albumin is the most abundant protein in plasma. Its main purposes are to provide oncotic pressure to plasma thus preventing tissue oedema and to function as a carrier molecule of nutrients and waste products between blood and tissue. Serum albumin is present both in the vascular circulation and in the interstitial fluid and it moves in between the two compartments, while delivering and removing substances to/from cells in the tissue. Serum albumin is a globular protein with hydrophobic pockets and interaction sites that bind fatty acids, hormones, vitamins, pharmaceuticals, toxins and other compounds.

The serum albumin used in the present invention could be from human, bovine or other mammalian source or produced through recombinant technology. In the present invention, serum albumin is preferably included in the solution at a concentration of 10 to 80 g/l, depending on the organ that is to be perfused. For example, for EVLP the concentration of serum albumin is preferably 50 to 80 g/l, and more preferably 65 to 75 g/l. For non-ischemic heart preservation (also termed NIHP) the concentration of serum albumin is preferably 10 to 80 g/l, more preferably 20 to 55 g/l. For kidney the concentration of serum albumin is preferably 10 to 50 g/l, and more preferably 20 to 40 g/l.

Recombinant serum albumin may have some bound components, from the culture medium and the culture organism, and may also have some bound citrate, for stabilisation, but a large number of the binding sites are empty, and so it is more or less naked from the normal complexity of endogenous and exogenous molecules bound to serum albumin in blood. This makes it particularly suitable for use in some embodiments of the present invention.

Where recombinant serum albumin is used in perfusion solutions, the recombinant serum albumin is usually purified before use. Methods for purification of recombinant serum albumin are conventional in the art, and suitable processes will be known to the skilled person.

Serum albumin derived from serum, even if carefully washed, still contains certain substances that might provide beneficial effects and is therefore the preferred staring point in other embodiments of this invention. Examples of commercially available serum albumin products are Albunorm from Octapharma and Albutein from Griffols.

Where mammalian serum albumin is used in perfusion solutions, the mammalian serum albumin is usually cleaned through use of the Cohn process or similar methods utilizing ethanol precipitation and liquid chromatography steps to make it suitable for use. By "cleaned" we mean that the serum albumin has been subjected to steps of fractionated precipitation and re-solubilization to remove other plasma components and substances bound to the serum albumin when in blood. For example, clinically used human serum albumin obtained from blood donors is usually prepared through steps of precipitation and liquid chromatography. The serum albumin is thus largely stripped of the many components bound to it when in blood. Serum albumin is usually stabilised using sodium chloride, N-acetyl DL Tryptophan and caprylic acid. This is conventional in the art, and suitable processes will be known to the skilled person.

In other words, many of the substances naturally bound to serum albumin are removed during this process, leaving binding sites free. In the present invention it can then be described as clean. This is easily distinguishable from serum albumin occurring naturally in the blood.

By using purified recombinant serum albumin or cleaned serum albumin at the beginning of the method of the invention, the serum albumin has empty binding sites, which molecules can bind to. This means that this serum albumin can be used as a vehicle to deliver beneficial substances and to remove potentially toxic substances to and from the cells of the endothelium as well as to or from other cell types in contact with the perfusate through the interstitium, and thereby improve the condition of the vascular endothelium and the organ or tissue.

In a preferred embodiment, the serum albumin is plasma derived human serum albumin.

Acetylating Agent

In the present invention, the serum albumin is acetylated. By this we mean that the serum albumin has been modified by the addition of an acetyl group, i.e. —C(O)CH$_3$. It is thought that serum albumin is acetylated at the lysine and N-terminal residues. Not all the available sites need to be acetylated. In the context of the present invention, "acetylated" means that at least some sites of a serum albumin molecule are acetylated. Preferably at least 25% of the serum albumin should be acetylated at one or more binding sites, more preferably at least 50% of the serum albumin should be acetylated at one or more binding sites.

According to a preferred embodiment of the invention, the molar ratio of serum albumin to acetylating agent in the organ preservation and/or perfusion solution is between 1:2 and 2:1, and can be about equimolar.

Acetylation is also expressed as the serum albumin being "loaded", in this case with acetyl groups. As discussed before, the serum albumin can also be loaded with other compounds.

The preferred acetylating agent is acetylsalicylic acid (ASA). Alternative molecules that could be used to acetylate serum albumin are p-Nitrophenyl Acetate and other molecules with aromatic structures comprising an acetyl group that could be donated. Any acetylating agent could work in the present invention, but the alternatives might be less favourable due to the toxicity profile of the remaining molecule left after acetylation. When ASA is used as the acetylating agent, salicylic acid, which is known to be safe, is left in the solution. The salicylic acid also partly binds to the serum albumin and it has anti-inflammatory properties that might add beneficial effects to the solution.

If alternative acetylating agents are used or if the salicylic acid is not considered beneficial to the use of the solution, the acetylation could take place in a first processing step including an incubation time, that could then be followed by dialysis or liquid chromatography or any other means known in the art, to remove the remaining acetylating and the remaining by-products from the process. This acetylating step might be done before or after the serum albumin is carefully heat treated to reduce contaminating viruses. If done before heat treatment, the acetylating process might improve stability of the serum albumin during the heat treatment process.

Acetylsalicylic acid (ASA) has been used as a pharmaceutical for decades for its anti-inflammatory and pain relief functions. ASA is known to modify serum albumin through acetylation of lysine and N-terminal residues. The acetylation of serum albumin affects its pseudo-esterase activity and its affinity to certain drugs and to prostaglandins.

The acetylation and glycation reactions with serum albumin are time and temperature dependent. In the method of the invention, the serum albumin is mixed with a solution containing electrolytes and the acetylating agent. By electrolytes, we mean the electrolytes that are usually in such solutions, which are those present in normal plasma, in similar or the same concentrations to plasma, as below. The acetylating agent might first be dissolved in ethanol and then mixed with the serum albumin in an electrolyte solution. Normally the solution will also contain other components including glucose, as below.

Effective acetylation requires that the solution is incubated for a time. Preferably the solution is incubated for at least 12 hours at 25° C. or at least 24 hours at 2 to 8° C. In practice, the solution is usually stored for weeks, months or years of shelf-life. During the incubation, part or all of the acetylsalicylic acid would react with and acetylate the serum albumin and thus change the chemical structure of the serum albumin. Preferably at least 25% of the serum albumin should be acetylated at one or more binding sites, more preferably at least 50% of the serum albumin should be acetylated at one or more binding sites. The modified structure of the serum albumin changes the function of the serum albumin improving its ability to prevent vascular endothelial injury.

In solutions containing glucose, the reduction of glycation due to competitive acetylation occurs, reducing the production of AGEs compared to non-acetylated serum albumin. The effect is particularly predominant when the solution is stored for weeks, months or years of shelf-life.

When ASA is used as the acetylation agent, it is preferably included in the organ preservation and/or perfusion solution at the concentration of 0.01 to 1.0 g/l, more preferably 0.05 to 0.5 g/l, or 0.1 to 0.3 g/l. Also, when ASA is used as the acetylation agent, the organ preservation and/or perfusion solution comprises salicylic acid as a remaining molecule left after acetylation of the serum albumin by the ASA.

If the acetylating process is done in a separate process step, followed by for example dialysis or liquid chromatography of the serum albumin, much higher concentrations of the acetylating agent might be used. In those cases the aim could be to acetylate most or all of the available acetylating sites on the serum albumin, aiming for a molar ratio of acetylating agent to serum albumin of 4:1 to 16:1, more preferably 4:1 to 8:1.

Other Compounds

In the invention, the serum albumin is acetylated. In preferred embodiments of the invention, the serum albumin is also loaded with other compounds that bind to or react with it, including fatty acid molecules; fat soluble vitamins; antioxidants; hormones; trace elements; a pharmaceutical; NO donors; or combinations thereof. These components could further improve the interaction between the solution and the vascular endothelium, resulting in reduced vascular resistance and/or improved or maintained vascular integrity, protecting the organ during perfusion.

The present inventors have realised that serum albumin can be used as a vehicle to deliver beneficial substances and to remove potentially toxic substances to and from the cells of the endothelium as well as to or from other cell types in contact with the perfusate through the interstitium, and thereby improve the condition of the vascular endothelium. In particular, serum albumin can be advantageously loaded with compounds in addition to acetyl groups that can have a beneficial effect on organs or tissue comprising vascular endothelium. Depending on the components used to load with serum albumin, other cell types beneath the vascular endothelium might benefit.

In contrast, when serum albumin is not loaded before use in a perfusion solution, the serum albumin might instead extract important components from the vascular endothelium or other cells.

In the method of the present invention, the serum albumin is mixed and incubated with a solution comprising electrolytes and an acetylating agent. In this way the serum albumin is loaded with acetyl groups, otherwise known as acetylated. In a preferred embodiment, the solution also contains one or more other compounds that bind to or react with the serum albumin thereby further loading the serum albumin. The solution might also comprise dextran, glucose and buffer. Alternatively, a separate step of incubation with the further compounds might be needed, for example if they are not soluble in water. In this case, the further compounds could be incubated with the serum albumin in a suitable solvent, for example alcohol, to ensure binding between the serum albumin and the further compound, prior to the step of mixing with the acetylating agent. As also some acetylating agents are not water soluble, this ethanol incubation might be used also for the acetylating process. Alternatively, non-water soluble molecules are dissolved in ethanol and then mixed into the serum albumin solution using heavy stirring.

The other compounds can be any compounds with a potentially beneficial effect to the organ being perfused, but are preferably selected from: a fatty acid molecules; fat soluble vitamins; antioxidants; hormones; trace elements; a pharmaceutical; NO donors; or combinations thereof.

Accordingly, the loaded serum albumin could be used, for example, to deliver vitamins and/or pharmaceutical substances to the cells in the tissue, while removing potentially toxic substances such as certain fatty acids and prostaglandins. If the solution is replaced, partly or fully during perfusion, the solution will be replenished with the beneficial substances and the negative substances that have bound to the serum albumin will be removed from the system. Further details of the compounds that bind to or react with serum albumin are given below.

Binding of molecules to the purified recombinant serum albumin or cleaned serum albumin can be to a variety of binding sites specific or unspecific to a particular molecule or class of molecule and when two molecules interact with the same binding site, the binding will be competitive in nature. This means that binding of one molecule with a higher affinity might preclude binding of another molecule with a lower affinity for the binding site, offering a possibility to in vitro tailor the functions of the loaded serum albumin.

Alternatively, when the compound reacts with serum albumin, it chemically modifies the serum albumin, and can thereby improve its properties, such as by acetylation, as above. The term "loading" encompasses both binding to and reacting with serum albumin.

Fatty Acids

Fatty acids bind readily to serum albumin. However, the fatty acid binding sites of cleaned serum albumin are usually partly occupied by caprylic acid used to stabilise serum albumin during pasteurisation. The serum albumin used for production usually comprises about 3 to 4 mM caprylic acid. During production of acetylated serum albumin, this can be diluted to about 1 to 2 mM caprylic acid in the final perfusion solution. Most tissue, but especially liver, heart, adipose tissue and skeletal muscle can metabolize the caprylic acid in the perfusion solution, allowing for available binding sites for removal of toxic residual products produced in the ischemic tissue. This cleansing effect of serum albumin during ex vivo perfusion could be further improved through in vitro competitive loading, exchanging the caprylic acid with more beneficial fat-soluble molecules requested by the cells in higher demand.

In general, fatty acids, especially prostaglandins are considered negative for the tissue that has been ischemic and their removal might therefore improve outcomes during ex vivo perfusion as well as post transplantation. Although, most fatty acids appear to have negative effects to the perfusion some fatty acids might be beneficial. 1-palmitoyl-2-arachidonoyl-sn-glycero-3-phosphorylcholine (OxPAPC) and sphingosine-1-phosphate (S1P), have been shown to have lung endothelium protective effect in vivo after various insults and might provide a protective effect if used for in vitro loading of serum albumin.

Nitroalkene derivatives of oleic acid (OA-NO2) are endogenous molecules with several signalling properties and they bind to serum albumin and might therefore be used for in vitro loading.

OxPAPC, OA-NO2, and S1P bind to serum albumin and could therefore be used for in vitro loading providing beneficial functions during ex vivo organ perfusion.

Ethanol could also bind to the fatty acid sites of serum albumin. It could be used to solubilize non-polar molecules before mixing with the solution, but it might also provide additional benefits in being a vasodilator.

Fat Soluble Vitamins

Fat soluble vitamins are not possible to include in a water-based solution, unless they are bound to a carrier molecule such as serum albumin. To allow them to bind, a solution of ethanol and the vitamins could be mixed with the purified recombinant serum albumin or cleaned serum albumin to produce an in vitro loaded serum albumin.

The fat-soluble vitamins are vitamins A, D, E and K. Any of these could advantageously be used for in vitro loading of cleaned serum albumin.

Antioxidants

Apart from the anti-oxidative effects of certain fat-soluble vitamins, molecules with specific antioxidative effects might be beneficial to include in the perfusion solution to protect from reactive oxygen species produced in ischemic tissue that is being re-oxygenated. Therefore, molecules like glutathione is commonly used in perfusion solutions. The problem with this is that these substances are unstable and usually reduced before the perfusion solution is used.

2-Mercaptopropionylglycine (MPG) is an antioxidant that is freely soluble in water where it is sensitive to reduction reactions. If pre-incubated during the in vitro loading of purified recombinant serum albumin or cleaned serum albumin, it binds to the serum albumin through formation of a disulphide bridge to the free thiol groups on the serum albumin and is thereby protected and maintains its antioxidative function when it is used.

Glutathione might be protected by the serum albumin when used for the in vitro loading of purified recombinant serum albumin or cleaned serum albumin. This interaction is through surface adsorption.

Hence, in vitro loading of serum albumin with these molecules would provide a possibility to improve stability of anti-oxidants when used in perfusions solutions, intended to be produced and stored before use.

Hormones

Hormones are highly biological active substances required for maintaining physiology in a multi-cell organism. Hormones comprise steroids, eicosanoids and amino acids/proteins. Biologically active steroids are in vivo unspecific and loosely bound to serum albumin. This mechanism helps regulate the steroid concentration in plasma, providing a more constant bioavailability. Purified recombinant serum albumin or cleaned serum albumin can be in vitro loaded with steroids, such as cortisone, prednisolone or methylprednisolone. The in vitro loading, during incubation/storage stabilizes the steroids in the solution and allows for an equilibrium to establish, providing a stable bioavailability during use of the perfusion solution.

Triiodothyronine is a protein hormone that binds to serum albumin, forming an equilibrium and providing an even bioavailability if in vitro loaded to the serum albumin.

Melatonin binds to serum albumin at low affinity and might be used for in vitro loading of purified recombinant serum albumin or cleaned serum albumin. Melatonin is a potent endogenously occurring antioxidant that protects organisms from oxidative stress.

Somapacitan is a human growth hormone derivate that binds reversibly to serum albumin and could therefore be used as a replacement for endogenous growth hormones less stable in a perfusion solution, when used after in vitro loading of purified recombinant serum albumin or cleaned serum albumin.

Trace Elements

Trace elements, such as Cu2+ and Ni2+ are bound to serum albumin in human plasma. Copper deficiency causes an exaggerated response of blood vessels to inflammatory stimuli. Platelet aggregation is increased in copper deficiency. Copper deficiency leads to proinflammatory effects in neutrophils and in microvascular endothelial cells, promoting interactions between neutrophils and endothelium. Avoiding Cu2+ deficiency during isolated organ or tissue perfusion might be achieved through in vitro loading of Cu2+ to purified recombinant serum albumin or cleaned serum albumin.

Pharmaceuticals

Many pharmaceuticals bind in vivo to serum albumin and their bioavailability is regulated by their interaction with serum albumin. Using in vitro loading of such pharmaceutical substances to serum albumin might improve stability in the solution and improve the regulation of the substances as time has been allowed to establish equilibrium. Examples of suitable pharmaceuticals are presented below.

Thrombin is a main mediator for loss of lung endothelial barrier function in vivo, and so supplementation with a specific thrombin inhibitor might be useful.

In vivo 20% of Argatroban is bound to human serum albumin, hence Argatroban could be used for in vitro loading of serum albumin. The normal initial Argatroban dosage in clinical practice is 2 µg/kg/min. A bolus dose administered to a perfusion solution is preferably between 1 to 50 mg/L or preferably between 20 to 30 mg/L.

Clenbuterol is a sympathomimetic amine used by sufferers of breathing disorders as a decongestant and bronchodilator. People with chronic breathing disorders such as asthma use this as a bronchodilator to make breathing easier. It is most commonly available as the hydrochloride salt, clenbuterol hydrochloride, and could be usefully loaded onto serum albumin in a preservation or perfusion solution.

NO Donors

NO donors are known vasodilators. Examples of physiologically acceptable NO donors are thionitrites, S-nitrosoglutathione (GSNO) and arginine. These could be usefully loaded onto serum albumin in a preservation or perfusion solution.

Organ Preservation and/or Perfusion Solution

The present invention relates to an organ preservation and/or perfusion solution which, as well as the acetylated serum albumin, contains other components. In a preferred embodiment, the solution also contains dextran, glucose, calcium ions, a buffer, and water.

Energy substrates are required for organ perfusion. The higher the temperature, and the longer the perfusion, the more energy substrate is needed. Glucose is a commonly used energy substrate in organ perfusion solutions. In prior art perfusion solutions, such as STEEN Solution, the concentration of 11 mM results in a hyperglycaemic state.

As discussed above, however, when used in a solution comprising serum albumin a hyperglycaemic level of glucose can generate AGEs during storage. Therefore, in addition to mitigating these effects by including an acetylation agent, alternative energy substrates would be preferable to use instead of or in addition to normo-glycaemic concentration of glucose of around 5 to 8 mM. Citric acid cycle metabolites are not stable in solution. Therefore instead it would be preferable if a higher sugar that could be metabolised into glucose was used in the solution. As dextranase is present in many tissues such as for example lung and liver tissue, Dextran 1 might be used as an additional metabolic substrate.

Dextran is known to protect the vascular endothelium through coating and reduction of interaction with hyperactivated leucocytes. The dextran should preferably be dextran 1, dextran 40, dextran 60 or dextran 70 or a combination of these dextrans. In a preferred embodiment the solution comprises dextran 40 in a concentration between 1 to 50 g/l or 1 to 30 g/l, preferably between 1 to 10 g/l. In a preferred embodiment the solution comprises a combination of dextran 40 and dextran 1, with Dextran 1 at a level of up to 1 g/l. Dextran 1 is an osmotic agent and could also be used as an energy substrate in the organ or tissue that is perfused.

Alternatively, other higher sugars such as raffinose might be useful as energy substrates. Dextran 1 or an alternative energy substrate source that does not destabilize the serum albumin during storage as glucose or fructose do, would be beneficial to avoid destabilisation of the partly acetylated serum albumin. This is especially so as the solution may be stored for an extended time, usually up to one or two years from production and during this time, it would be beneficial to have a normal physiological glucose concentration of about 5 to 8 mM to reduce the risk of serum albumin glycation during storage.

The acetylated serum albumin is preferably delivered in a near normo- or slightly hyperosmotic salt solution, comprising electrolytes close to concentrations in normal plasma. Accordingly, the perfusion solution usually contains electrolytes, such as Na+ at a concentration of 100 to 160 mM, and/or Cl– at a concentration of 90 to 130 mM, and/or K+ at a concentration of 4 to 6 mM and/or $PO_4$3– at a concentration of 0.5 to 2 mM and/or Ca2+ at a concentration of 0.5 to 2 mM and/or Mg2+ at a concentration of 0.5 to 2 mM and/or HCO3– at a concentration of 5 to 30 mM. The exception to that is if a heart is to be treated during cardioplegia, in which case the potassium ion concentration must be increased to between 15 mM to 120 mM, preferably between 15 to 30 mM and the magnesium ion concentration should preferably be increased to between 4 to 10 mM to protect the endothelium from the vasoconstrictive effect of the high potassium concentration.

The acetylated serum albumin is preferably also delivered in a slightly hyper-oncotic solution, provided by serum albumin and the dextran 40 content of the solution, except when intended for kidney perfusion in which case the solution should preferably be provided normo- or hypo-oncotic to allow for concentration during urine production.

The solution is preferably pre-buffered, usually using tris(hydroxymethyl)aminomethane (also termed Tris). Tris can be included in the solution in a concentration of, for example, 1 to 10 mM. In a preferred embodiment, the solution has a pH of 6.6 to 7.8 or more preferably 7.1 to 7.7 as measured at 25° C.

Uses

The present invention relates in one aspect to the use of an organ preservation and/or perfusion solution in isolated organ perfusion. The use can be for evaluation and/or treatment of isolated organs or tissue, in particular to reduce vascular resistance and/or to protect the endothelium.

The organ or tissue can be circulatorily isolated ex vivo or circulatorily isolated in vivo, preferably ex vivo. The isolated organ or tissue can be, for example, a lung or lungs, a heart, a kidney, a liver, a pancreas, intestines or a limb or limbs, preferably the organ is a lung or lungs. In the transplantation setting, the donor organ or tissue is flushed with a preservation and/or perfusion solution. This can be a conventional preservation and/or perfusion solution or the organ preservation and/or perfusion solution disclosed herein, to remove blood from the vasculature and to cool the organ or tissue down before isolated perfusion is initiated. The organ or tissue is then perfused with the organ preservation and/or perfusion solution disclosed herein. The acetylated serum albumin is useful for any organ or tissue comprising vasculature endothelium as that is where the main contact between the organ or tissue and the acetylated serum albumin takes place, although an effect might also be provided from acetylated serum albumin molecules that temporarily exit the vasculature and enter the interstitial compartment.

Normally if the organ or tissue is transplanted after perfusion, it is not transplanted into the body from which it came.

Isolated organs or tissues used in organ transplantation, have normally gone through a period of warm and/or cold ischemia before they are perfused. They might also have been through a cytokine storm and other detrimental processes in the dying donor before they are retrieved. Hence toxic substances and organ degradation has already begun before retrieval, which increase the need for removing the degradation products and toxic substances formed. The organs or tissue might also have been subjected to medical treatment before the donor was declared dead that might have negative effects on the particular organ. Therefore, a tailored serum albumin with the ability to deliver beneficial molecules while removing negative components could improve organ or tissue function post transplantation.

Isolated organ or tissue perfusion could be done at hypothermic, normothermic or hyperthermic conditions. Hypothermic conditions between 4 to 30° C., could be used to lower the metabolic requirement and increase the time the organ or tissue can withstand the isolation. This can be done, for example, if the perfusion will be carried out over one or more days. Normothermic conditions of 30 to 37° C. could be used for therapeutic treatment or for evaluation purposes. This can be done, for example, if the therapeutic treatment or evaluation will be carried out for 1 to 24 hours. The hyperthermic conditions could be used to increase pharmaceutical uptake or efficiency or as treatment in itself, as both pathogens and cancer cells are sensitive to hyper-thermic conditions.

As discussed above, the loaded serum albumin is not only a delivery vehicle for compounds, it has also the ability to remove less beneficial substances from tissue or plasma and thus preventing the negative effect of such substances. Examples of such substances are prostaglandins and fatty acids. Through cleaning and loading of the serum albumin the albumin could be more or less tailored to retrieve those substances. If the perfusion solution is partly or fully replaced at one or more time points during the isolated perfusion, this effect could be enhanced and more of the sub-beneficial or detrimental substances could be removed from the circulation.

The loaded albumin perfusate solution could be utilised in any perfusion system. Examples of perfusion systems for lung perfusion are XPS, LS and OCS. It could also be used in any heart perfusion system. Examples of such perfusions systems are XVIVO Heart preservation system and OCS. Examples of perfusion systems for kidney perfusion are LifePort Kidney Transporter and Kidney Assist Transport system. Examples of perfusion systems for liver perfusion are LifePort Liver Transporter, OrganOx, Liver Assist Transport system, and OCS.

As the vascular resistance is decreased through use of the acetylated serum albumin, the flow could be increased compared to when other perfusates are used. This is especially true for initially sub-optimal organs, that are more difficult to perfuse than initially optimal organs. An increased flow could improve the completeness of the perfusion of the organ or tissue to be perfused. For example, in a lung perfusion system using the Toronto protocol, flow could be increased from 40% conventionally to 60 to 100% with the organ preservation and/or perfusion solution disclosed herein. If instead the Lund protocol is being used, the perfusion time could be extended from 1-2 hours conventionally to 3-12 hours with the organ preservation and/or perfusion solution disclosed herein.

As the acetylated serum albumin solution is more protective to the vascular endothelium than previous preservation and perfusion solutions containing serum albumin, more organs will sustain extended perfusion or perfusion at higher flow than they otherwise would. One advantage of using a higher flow is that it could be evaluated ex vivo whether an organ is able to sustain the full blood flow that the organ will be subjected to post-transplantation. Another advantage could be that a higher proportion of the perfused organ is being perfused. This is especially true for the lungs where the higher flow would improve the perfusion of the bronchial circulation and thereby better preserve that structure. The possibility to use physiological flow at physiological pressure during perfusion could also be that the sheer stress of the vascular endothelium is normalised. The reduced vascular resistance during perfusion, has the advantage that the stress the organ is subjected to during ex vivo perfusion is reduced, resulting in less perfusion injury and makes it possible to perfuse also more fragile organs. An example of more fragile organs could be organs subjected to prolonged warm ischemic damage during use of uncontrolled donors after cardiac death.

The use of an organ preservation and/or perfusion solution in isolated organ or tissue perfusion can be carried out as a method. Thus, in some embodiments the invention relates to a method of use an organ preservation and/or perfusion solution in isolated organ or tissue perfusion. The method can be for evaluation and/or treatment of isolated organs, in particular to reduce vascular resistance and/or to protect the endothelium. The organ can be circulatorily isolated ex vivo or circulatorily isolated in vivo, preferably ex vivo. The isolated organ can be, for example, a lung or lungs, a heart, a kidney, a liver, a pancreas, intestines or a limb or limbs, preferably the organ is a lung or lungs, but tissues can also be perfused.

In the transplantation setting, the method comprises a step of flushing the donor organ or tissue with a preservation and/or perfusion solution, e.g. a conventional preservation and/or perfusion solution or the organ preservation and/or perfusion solution disclosed herein, to remove blood from the vasculature and to cool the organ or tissue down before isolated perfusion is initiated. The method also comprises a step of perfusing the organ or tissue with the organ preservation and/or perfusion solution disclosed herein. Preferably, in normo-thermic or hyper-thermic conditions are used the perfusing of the organ or tissue is carried out continuously. The perfusing can be carried out continuously, for example, for at least one hour, and up to several days or more, depending for example on the type and quality of the organ or tissue being perfused and whether the organ or tissue is being evaluated and/or treated. Alternatively, if the perfusion is done at hypo-thermic conditions the perfusion could be carried out intermittently, in cycles. For example the organ or tissue might be perfused for 15-180 minutes followed by a period of no or low perfusion for 60-360 minutes. Preferably the flow used during evaluation of the organ or tissue is about corresponding to the normal blood flow in l/minute, through the perfused organ or tissue at rest, as estimated from the donor size. Preferably this flow is obtained at physiologically expected pressures at rest. For example for a 70 kilo male, the estimated total cardiac output at rest is about 4 l/min. The complete volume of 4 l/min will pass the lungs, although other organs might not receive the complete blood volume.

In some embodiments of the method, if the organ or tissue is transplanted, it is not transplanted into the body from which it came. In some embodiments the organ or tissue is a human organ or tissue. In some embodiments, the organ or tissue is transplanted into a patient in need thereof, e.g. a human in need of an organ or tissue transplant.

In some embodiments, the isolated organ or tissue perfusion could be done at hypothermic, normothermic or hyperthermic conditions, as described above.

In some embodiments, the organ or tissue is cooled to hypothermic conditions prior to flushing and perfusion. This is to avoid vasoconstriction typical of perfusion of an isolated organ or tissue under normothermic conditions without first having subjected the organ or tissue to hypothermic conditions. Flushing is normally not used for in vivo isolated organ perfusion, where instead the patients blood is mixed with the perfusion solution and the pharmaceutical agents used for the local treatment.

As discussed above regarding use, as the vascular resistance is decreased through use of the acetylated serum albumin, the flow could be increased compared to when other perfusates are used. In some embodiments, in a lung perfusion system using the Toronto protocol, flow could be increased from 40% conventionally to 60 to 100% with the organ preservation and/or perfusion solution disclosed herein. In some embodiments if instead the Lund protocol is being used, the perfusion time could be extended from 1-2 hours conventionally to 3-12 hours with the organ preservation and/or perfusion solution disclosed herein. In some embodiments, the flow is a physiological flow at physiological pressure.

Treatment

The present invention relates in another aspect to use of acetylated serum albumin to treat vascular complications of diabetes, cardiovascular disease or infectious diseases affecting the vasculature integrity, including acute respiratory distress syndrome (also termed ARDS). Indeed, it might be beneficial to use acetylated serum albumin in any fluid therapy in which serum albumin is commonly utilized.

The serum albumin can be extracted from an individual, acetylated, and optionally loaded with other compounds in vitro, and then returned to the same individual as treatment for a disease. Alternatively, mainly for logistical reasons, a blood donor derived or purified recombinant serum albumin that can be managed in a larger scale process is more effective. For example acetylated serum albumin could be used for treatment of vascular complications of diabetes, cardiovascular disease, infectious diseases affecting the vasculature integrity or acute respiratory distress syndrome either through isolated lung perfusion or directly as administered to the patients circulation, for example by infusion.

The acetylated and optionally additionally loaded serum albumin could be used in isolated organ or tissue perfusion or infusion when further mixed with a pharmaceutical agent.

Acetylated serum albumin could be provided in an organ preservation and/or perfusion solution as per preferred embodiment of the invention described herein, or it could be provided in a simpler solution. The simpler solution could comprise salts, preferably where the solution is a near normo-osmotic salt solution comprising electrolytes close to concentrations in normal plasma as described above. Alternatively it might be a plain acetylated serum albumin solution only comprising addition of sodium chloride, N-acetyl DL Tryptophan and caprylic acid. Such solution does not usually comprise the other components such as glucose. Glucose is already present in the blood stream.

The use of acetylated serum albumin to treat vascular complications of diabetes, cardiovascular disease or infectious diseases affecting the vasculature integrity, including acute respiratory distress syndrome, can be carried out as a method. Thus, in some embodiments the invention relates to a method of treatment of vascular complications of diabetes, cardiovascular disease or infectious diseases affecting the vasculature integrity, including acute respiratory distress syndrome in a patient in need thereof. The method comprises a step of administering a solution comprising the acetylated serum albumin to the patient.

In some embodiments of the method, the method further comprises steps of extracting serum albumin from the patient, acetylating the serum albumin in a solution, and optionally loading the serum albumin with other compounds in vitro, prior to the step of administering the solution comprising the acetylated serum albumin to the patient.

The step of acetylating the serum albumin can be carried out as described above, e.g. including steps of mixing the serum albumin with a solution containing electrolytes to form an organ preservation and/or perfusion solution, wherein the solution also contains an acetylating agent; and incubating the mixture, so that the serum albumin becomes acetylated. Alternatively, a concentrated serum albumin solution can be incubated with the acetylating agent. Preferably the incubation is at least 2 hours, more preferably at least 12 hours. After incubation, the remaining acetylating product and the by-products from the process are removed through dialysis, liquid chromatography, or any other known means in the art. The acetylating process could be performed before or after careful heat treatment (pasteurisation) of the serum albumin to remove potential virus load. Preferably the acetylating process is done before heat treatment to improve the stability of the serum albumin during the careful heat treatment process.

The preferred acetylating agent is ASA, as discussed above, although alternative molecules such as p-Nitrophenyl Acetate and other molecules with aromatic structures comprising an acetyl group that could be donated can also be used. For acetylation by use of ASA, the corresponding solution comprising the ASA and the serum albumin can be incubated for several hours to 1 week or more for acetylation of the serum albumin to occur. Preferably the solution is incubated for at least 12 hours at 25° C. or at least 24 hours at 2 to 8° C.

As noted above, when ASA is used as the acetylating agent, salicylic acid is left in the solution. Although ASA is known to be safe, and might add beneficial effects to the solution, in some embodiments it may be preferable to remove the salicylic acid left in the solution, following acetylation of the serum albumin, before administering the solution comprising the acetylated serum albumin to the patient. This may be preferable, for example, for a patient being treated for acute respiratory distress syndrome, to decrease the risk of bleeding in the patient that may be caused by salicylic acid. The salicylic acid can be removed from the solution, for example, by dialysis or liquid chromatography.

In some embodiments, the step of administering the solution comprising the acetylated serum albumin to the patient is carried out by infusion of a solution comprising the acetylated serum albumin, e.g. an organ preservation and/or perfusion solution as disclosed herein comprising the acetylated serum albumin, or a simpler solution as described above comprising the acetylated serum albumin.

EVLP

Preferred perfusate composition for EVLP is shown in Table 1.

Additional supplements selected from the discussion above and/or heparin, antibiotics, insulin, IGF, adrenalin, noradrenalin and a net inhibitor as cocaine may be included and/or provide additional advantages.

Different variations of the above formulation have been evaluated in a 24 h EVLP model. Due to ethical and cost reasons not all possible versions within the scope of the application could be investigated.

Universality of the Perfusate Solution

A perfusate solution with the above preferred composition would be beneficial for any organ or tissue with vascular endothelium when perfused at any temperature, with the following exceptions. First, when used for cardioplegic heart preservation the perfusate solution as is shown in Table 2 below. Second, when used for kidney perfusion, additional dilution of the perfusate solution might be necessary, due to excretion of urine, which will concentrate the solution during use.

Non-Ischemic Heart Preservation (NIHP)

NIHP is done at hypothermic conditions between 5 and 30° C. or more preferably between 6 and 10° C. NIHP requires a cardioplegic heart. Therefore, the potassium and magnesium concentrations are increased. Additional supplements including heparin, antibiotics, insulin, triiodothyronine, adrenalin, noradrenalin and a net inhibitor as cocaine may be included.

TABLE 2

Preferred perfusate composition for NIHP

| Component | Concentration interval for each components | More preferred interval |
|---|---|---|
| $Na^+$ | 100-160 mM | 125-155 mM |
| $Cl^-$ | 90-130 mM | 100-120 mM |
| $K^+$ | 12-40 mM | 15-25 mM |
| $PO_4^{3-}$ | 0.5-2 mM | 1-1.4 mM |
| $Ca^{2+}$ | 0.5-2 mM | 1.2-1.6 mM |

TABLE 1

Preferred perfusate composition for EVLP

| Component | Concentration interval for each component | More preferred interval | Composition used in Ex 1, 2 and 3 below (Test solution 2 composition) |
|---|---|---|---|
| $Na^+$ | 100-160 mM | 125-155 mM | 137-150 mM* |
| $Cl^-$ | 90-130 mM | 100-120 mM | 105-115 mM* |
| $K^+$ | 4-6 mM | 4.4-4.8 mM | 4.6 mM |
| $PO_4^{3-}$ | 0.5-2 mM | 1-1.4 mM | 1.2 mM |
| $Ca^{2+}$ | 0.5-2 mM | 1.2-1.6 mM | 1.5 mM |
| $Mg^{2+}$ | 0.5-2 mM | 1.0-1.4 mM | 1.2 mM |
| Tris | 1-10 mM | 1-4 mM | 2 mM |
| $HCO3^-$ | 5-30 mM | 10-15 mM | 15 mM |
| D-glucose | 0-10 mM | 2-8 mM | 6 mM |
| human serum albumin | 50-80 g/l | 65-75 g/l | 70 g/l |
| Dextran 40 | 0-30 g/l | 1-10 g/l | 5 g/l |
| Dextran 1 | 0-1 g/l | 0.3-0.7 g/l | 0.5 g/l |
| ASA | 0.01-1.0 g/l | 0.05-0.5 g/l | 0.1 g/l |
| Retinoic acid | 0-0.005 g/l | 0.0001-0.002 g/l | 0.0005 g/l |
| Methylprednisolone | 0-0.3 g/l | 0.001-0.01 g/l | 0.0035 g/l |
| Arginine | 0-5 mM | 1-3 mM | 1.5 mM |

*Final composition depends on contribution from human serum albumin and therefore not provided exactly.

TABLE 2-continued

| | Preferred perfusate composition for NIHP | | |
|---|---|---|
| Component | Concentration interval for each components | | More preferred interval |
| Mg$^{2+}$ | 2-15 mM | | 5-10 mM |
| Tris | 1-10 mM | | 1-4 mM |
| HCO3$^-$ | 5-30 mM | | 10-15 mM |
| D-glucose | 0-10 mM | | 2-8 mM |
| Human serum albumin | 10-80 g/l | | 65-75 g/l |
| Dextran 40 | 0-30 g/l | | 0.1-10 g/l |
| Dextran 1 | 0-1 g/l | | 0.3-0.7 g/l |
| ASA | 0.01-1.0 g/l | | 0.05-0.5 g/l |
| Retinoic acid | 0-0.005 g/l | | 0.0001-0.002 g/l |
| Methylprednisolone | 0-03 g/l | | 0.001-0.01 g/l |
| Arginine | 0-5 mM | | 1-3 mM |

Kidney Perfusion

For kidney perfusion a lower serum albumin concentration is preferred as the renal activity will concentrate the solution further. A lower oncotic pressure might also be preferable for kidney perfusion to allow for more urine production and lower the stress on the kidney. A preferred composition for renal perfusion is shown in Table 3.

TABLE 3

| | Preferred perfusate composition for kidney | | |
|---|---|---|
| Component | Concentration interval for each component | | More preferred interval |
| Na$^+$ | 100-160 mM | | 125-155 mM |
| Cl$^-$ | 90-130 mM | | 100-120 mM |
| K$^+$ | 4-6 mM | | 4.4-4.8 mM |
| PO$_4$$^{3-}$ | 0.5-2 mM | | 1-1.4 mM |
| Ca$^{2+}$ | 0.5-2 mM | | 1.2-1.6 mM |
| Mg$^{2+}$ | 0.5-2 mM | | 1.0-1.4 mM |
| Tris | 1-10 mM | | 1-4 mM |
| HCO3$^-$ | 5-30 mM | | 10-15 mM |
| D-glucose | 0-10 mM | | 2-8 mM |
| Human serum albumin | 10-50 g/l | | 20-40 g/l |
| Dextran 40 | 0-30 g/l | | 1-10 g/l |
| Dextran 1 | 0-1 g/l | | 0.3-0.7 g/l |
| ASA | 0.01-1.0 g/l | | 0.05-0.5 g/l |
| Retinoic acid | 0-0.005 g/l | | 0.0001-0.002 g/l |
| Methylprednisolone | 0-0.3 g/l | | 0.001-0.01 g/l |
| Arginine | 0-5 mM | | 1-3 mM |

EXAMPLES

Figure 1:
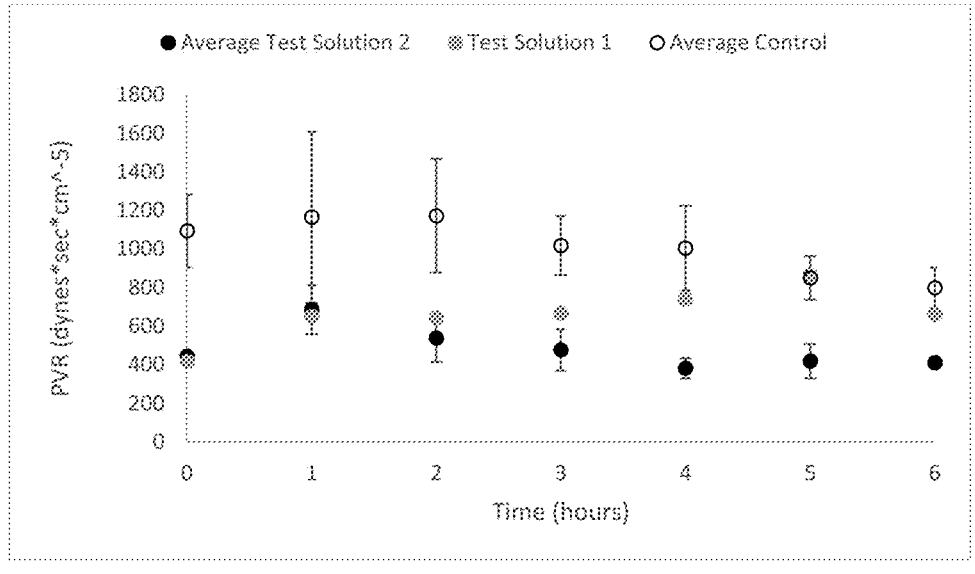
FIG. 1 shows measured PVR during EVLP experiments.

All examples were done in an isolated pig lung perfusion model. However, as the effect is related to interaction with vascular endothelium, any organ or tissue comprising vascular endothelium would benefit from the loaded serum albumin during perfusion.

The control experiments were done with commercially available STEEN Solution and the test experiments were done with an organ preservation and/or perfusion solution according to the present invention. Commercially available STEEN Solution is a near physiological electrolyte solution comprising serum albumin, dextran 40 and glucose.

All pigs were sedated and put under anaesthesia according to protocol. After the chest was opened, the lungs were flushed with Perfadex Plus solution (1000 mL room temperature, 1000 mL 4 degrees) before the heart was stopped and the lungs were retrieved.

All control experiments were performed with 2000 ml of STEEN Solution as perfusate, supplemented with 100 mg hydrocortisone, 10000 units heparin, and 100 mg Cilastatin. After one hour of EVLP, the solution was exchanged with fresh perfusate and the leucocyte filter was clamped off. The clamp time of the leucocyte filter is denoted time 0 in these experiments.

The time 0 as indicated in the graphs is indicating the time when about 1 hour of warm-up perfusion has been done with the respective solution, and the solution have been refreshed with new solution.

The transplantation model described in Example 3 utilized left sided lung transplantation followed by removal of the right lung, making the pig completely dependent on the transplanted lung. This is the most valid transplantation model to evaluate the function of a transplanted lung. A transplantation model with left lung transplantation without subsequent removal of the right lung is a much less stringent model and results are difficult to interpret as the right lung function will interfere with the results.

The test experiments were performed in the same way as the control experiments, but with perfusion solutions according to the present invention.

Example 1

A series of 12 to 24 h EVLPs were performed using the above described perfusate and method. There were three experiments using control solution, one using Test Solution 1 and two using Test Solution 2. The 24 h EVLPs were conducted according to the Toronto protocol, (Cypel et al 2008) except that recruitment manoeuvres were not used as a minimum intervention strategy was required for comparative evaluation of different perfusates.

The experiments were done as described above. The solution was exchanged after one hour, and then supplemented as required with water, glucose and buffer being added to the perfusate as needed to maintain the composition of the perfusate that changed due to metabolism and evaporation.

The test experiments including variations of the new perfusion solution were done in an identical way to the control experiments.

The different compositions investigated in this series Test solution 1 (Table 4) and Test solution 2 (Table 5). Test solution 1 was used in one of the experiments in Example 1. Test solution 2 was used in two experiments in Example 1 and in Examples 2 and 3.

TABLE 4

| Composition of Test solution 1 | |
| --- | --- |
| Compound | Concentration (g/L) |
| NaCl | 4.44 |
| D-glucose | 1.19 |
| KCl | 0.34 |
| NaH2PO4 | 0.17 |
| CaCl2 | 0.22 |
| MgCl2 | 0.24 |
| NaHCO3 | 1.26 |
| Human serum albumin | 70 |
| Dextran 40 | 5 |
| Dextran 1 | 0.5 |
| ASA | 0.25 |

The pH in Test solution 1 was adjusted with sodium bicarbonate during use as was done in the control experiments. At use the solution was supplemented with 100 mg hydrocortisone, 10000 units heparin, and 100 mg Cilastatin as in the control experiments.

The differences from STEEN Solution is lower NaCl, due to additional NaCl contribution from the serum albumin, lower glucose to reduce glycation during storage of the solution, addition of Dextran 1 to compensate for the reductions of NaCl and glucose and addition of ASA. The significant difference is the presence of ASA.

TABLE 5

| Test solution 2 | |
| --- | --- |
| Compound | Concentration (g/L) |
| NaCl | 4.44 |
| D-glucose | 1.19 |
| KCl | 0.34 |
| NaH2PO4 | 0.17 |
| CaCl2 | 0.22 |
| MgCl2 | 0.24 |
| Tris | 0.24 |

TABLE 5-continued

| Test solution 2 | |
| --- | --- |
| Compound | Concentration (g/L) |
| NaHCO3 | 1.26 |
| Arginine | 0.26 |
| Human serum albumin | 70 |
| Dextran 40 | 5 |
| Dextran 1 | 0.5 |
| ASA | 0.1 |
| Retinoic acid | 0.0005 |
| methylprednisolone | 0.0035 |

In Test solution 2 we have additionally included TRIS to have an improved stabilization of pH, arginine as an NO-donor to further relax the endothelium if required, retinoic acid as an antioxidant and methylprednisolone. At use, the solution was supplemented with 10000 units heparin, and 100 mg Cilastatin as in the control experiments.

Both Test solutions 1 and 2 were made through mixing of all ingredients together. The last stage of mixing was when the fat-soluble components, ASA, retinoic acid and methylprednisolone were dissolved in 99.9% ethanol and then quickly mixed into the solution. The pH was then adjusted to about 7.5 and the solutions were filled in sterile bottles through aseptic filtration. The solutions were then incubated for at least one week before use.

The results in FIG. 1 and Table 6 showed that the pulmonary vascular resistance (PVR) was lower compared to the control when Test solution 1 was used and that this effect was further improved and prolonged when Test solution 2 was used. This indicates that the active ingredients in the new perfusate cause vasodilation or reduce vasoconstriction, and thus reduce pressure in the system. The reduced pressure in the system allows increased flow, which can lead to a better perfused lung. See FIG. 1, which shows measured PVR during EVLP experiments. Time points are only shown until 6 hours due to different sampling times used for some of the experiments.

TABLE 6

| Measured PVR during EVLP experiments | | | | | | | |
| --- | --- | --- | --- | --- | --- | --- | --- |
| | Test PVR (dynes*sec*cm^-5) | | | | | | |
| Time | 0 | 1 | 2 | 3 | 4 | 5 | 6 |
| Test Solution 1 | 417 | 649 | 643 | 667 | 741 | 863 | 661 |
| Test Solution 2 (exp 1) | 427 | 558 | 415 | 369 | 434 | 508 | 431 |
| Test Solution 2 (exp 2) | 460 | 812 | 662 | 584 | 329 | 329 | 389 |
| Average | 434.7 | 673.0 | 573.3 | 540.0 | 501.3 | 566.7 | 493.7 |
| SD | 18.4 | 105.1 | 112.2 | 125.6 | 174.8 | 221.9 | 119.6 |
| | Control PVR (dynes*sec*cm^-5) | | | | | | |
| Time | 0 | 1 | 2 | 3 | 4 | 5 | 6 |
| Control experiment 1 | 1196 | 1787 | 1255 | 1231 | 923 | 1010 | 941 |
| Control experiment 2 | 1255 | 784 | 777 | 950 | 784 | 762 | 762 |
| Control experiment 3 | 828 | 923 | 1485 | 873 | 1306 | 779 | 690 |
| Average | 1093.0 | 1164.7 | 1172.3 | 1018.0 | 1004.3 | 850.3 | 797.7 |
| SD | 188.93 | 443.70 | 294.89 | 153.86 | 220.73 | 113.11 | 105.53 |

Figure 2:
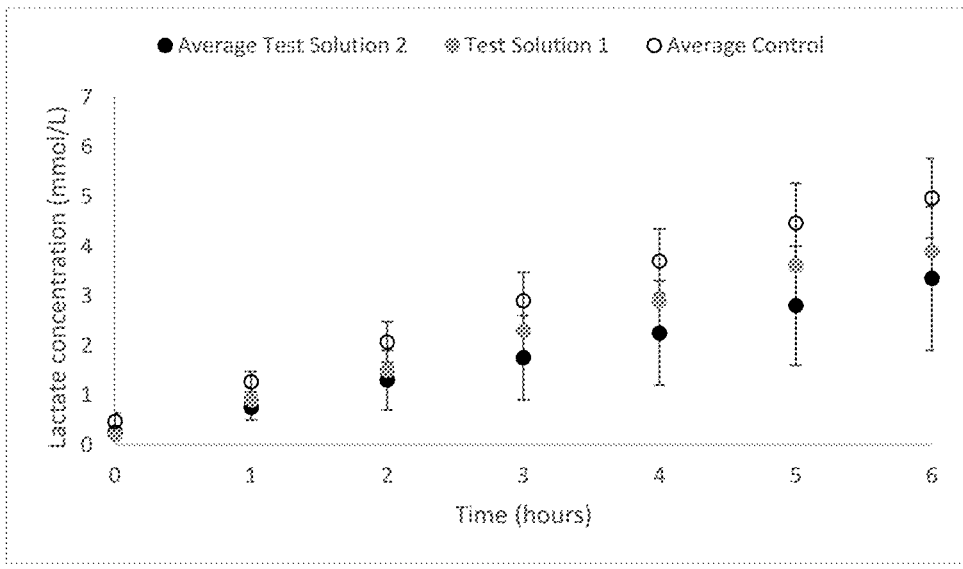
FIG. 2 shows measured lactate concentrations during EVLP experiments.

FIG. 2 and Table 7 show measured lactate concentrations during EVLP experiments. The lactate concentration increased throughout the EVLP experiment in both experimental groups, indicating decreased levels of oxygen in the lung tissue. Lactate in the control group was, however, generally higher than lactate in the test group, showing that the perfusate with acetylated serum albumin performed better than the control without. Also for lactate production, an improvement is seen with Test solution 1 which is further improved with Test solution 2. Time points are only shown until 6 hours due to different sampling times for some of the test experiments.

Figure 4:
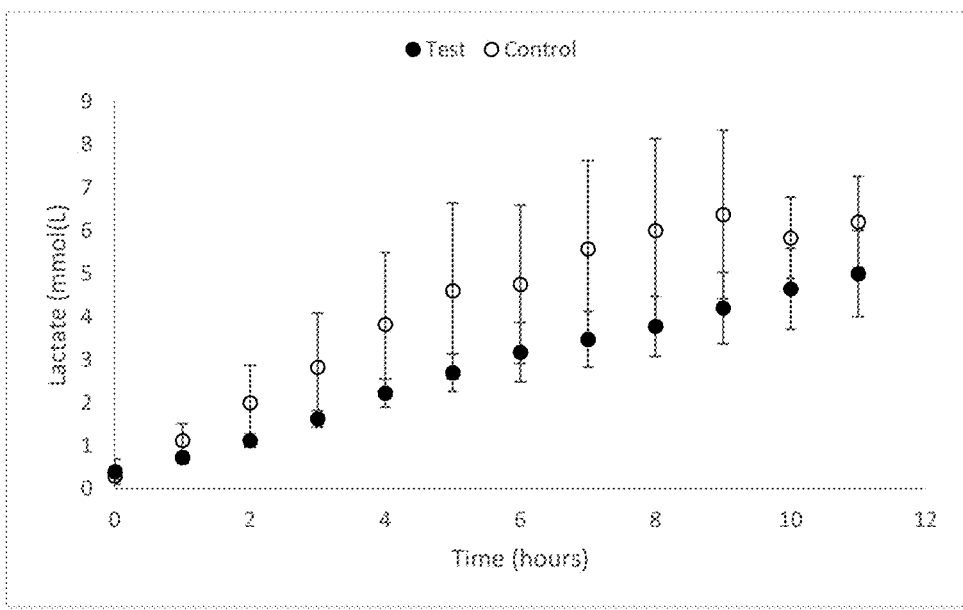
FIG. 4 shows measured lactate during EVLP experiments.

FIG. 4 and Table 9 show measured lactate during EVLP experiments. Results from one of the control pigs are missing after 9 hours at it did not sustain the EVLP. The results in the control group after 9 hours thus appear to be better than they actually were.

These Figures and Tables show that the variation in the control group was much higher, with two of the lungs on EVLP performing as well as with the new perfusate but with the other two not performing as well. All lungs in experiments with the perfusate according to this invention performed well and with only small variation between runs. The experiments were performed during spring-time between

TABLE 7

Measured lactate concentrations during EVLP experiments

Test Lactate (mM)

| Time | 0 | 1 | 2 | 3 | 4 | 5 | 6 |
|---|---|---|---|---|---|---|---|
| Test Solution 2 (exp 1) | 0.2 | 0.9 | 1.5 | 2.3 | 2.9 | 3.6 | 3.9 |
| Test Solution 2 (exp 2) | 0.2 | 0.5 | 0.7 | 0.9 | 1.2 | 1.6 | 1.9 |
| Test Solution 2 (exp 3) | 0.3 | 1 | 1.9 | 2.6 | 3.3 | 4 | 4.8 |
| Average | 0.23 | 0.80 | 1.37 | 1.93 | 2.47 | 3.07 | 3.53 |
| SD | 0.05 | 0.22 | 0.50 | 0.74 | 0.91 | 1.05 | 1.21 |

Control lactate(mM)

| Time | 0 | 1 | 2 | 3 | 4 | 5 | 6 |
|---|---|---|---|---|---|---|---|
| Control experiment 1 | 0.4 | 1.3 | 2 | 2.6 | 3.4 | 3.9 | 4.4 |
| Control experiment 2 | 0.7 | 1 | 1.6 | 2.4 | 3.1 | 3.9 | 4.4 |
| Control experiment 3 | 0.3 | 1.5 | 2.6 | 3.7 | 4.6 | 5.6 | 6.1 |
| Average | 0.5 | 1.3 | 2.1 | 2.9 | 3.7 | 4.5 | 5.0 |
| SD | 0.17 | 0.21 | 0.41 | 0.57 | 0.65 | 0.80 | 0.80 |

Example 2

A series of four control experiments compared to four test experiments with a new perfusate according to the invention was performed. The perfusate composition used in the test group was the Test solution 2 composition given above. The experiments were randomized. All experiments were intended to run for 12 hours, however, one of the control experiments was discontinued pre-maturely due to severe pulmonary oedema. The pigs and EVLPs were performed as described in Example 1.

Figure 3:
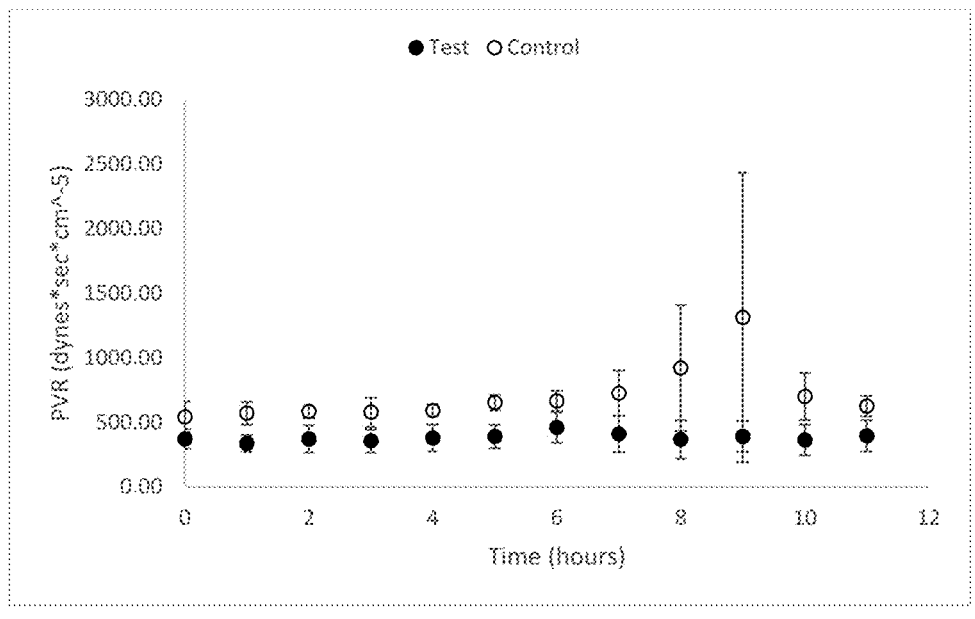
FIG. 3 shows measured PVR during EVLP experiments.

The results in FIG. 3 and Table 8 show measured PVR during EVLP experiments. Results from one of the control pigs are missing after 9 hours at it did not sustain the EVLP. The results in the control group after 9 hours thus appear to be better than they actually were.

March and April. Each week one experiment from each group was performed. During this period the initial quality of the lungs were improved, due to seasonal changes in the pig health. This is why the PVR values are higher overall in Example 2 (performed during spring time), than in Example 3 (performed early summer). As the pig health improved the differences between groups became smaller, resulting in the differences not being statistically significant. It is however shown, that the perfusate according to the invention provides improved stability of lungs during EVLP as also the less healthy pig lungs were completely stable on 12 hours of EVLP.

TABLE 8

Measured PVR during EVLP experiments

Test PVR (dynes*sec*cm^−5)

| Time | 0 | 1 | 2 | 3 | 4 | 5 | 6 | 7 | 8 | 9 | 10 | 11 |
|---|---|---|---|---|---|---|---|---|---|---|---|---|
| Test1 | 294 | 358 | 294 | 294 | 239 | 358 | 361 | 294 | 178 | 284 | 234 | 294 |
| Test2 | 310 | 242 | 241 | 242 | 317 | 256 | 331 | 256 | 267 | 260 | 256 | 256 |
| Test3 | 400 | 320 | 467 | 455 | 471 | 455 | 533 | 605 | 533 | 525 | 467 | 538 |
| Test4 | 481 | 421 | 481 | 427 | 485 | 489 | 615 | 485 | 489 | 492 | 496 | 489 |
| Average | 371.25 | 335.25 | 370.75 | 354.50 | 378.00 | 389.50 | 460.00 | 410.00 | 366.75 | 390.25 | 363.25 | 394.25 |
| SD | 75.15 | 64.80 | 105.05 | 88.98 | 103.85 | 90.84 | 118.11 | 142.15 | 148.46 | 119.13 | 118.95 | 121.25 |

TABLE 8-continued

Measured PVR during EVLP experiments

Control PVR
(dynes*sec*cm^-5)

| Time | 0 | 1 | 2 | 3 | 4 | 5 | 6 | 7 | 8 | 9 | 10 | 11 |
|---|---|---|---|---|---|---|---|---|---|---|---|---|
| Control 1 | 744 | 667 | 635 | 774 | 656 | 721 | 698 | 991 | 1743 | 3243 | | |
| Control 2 | 452 | 595 | 600 | 520 | 529 | 702 | 779 | 772 | 814 | 857 | 954 | 727 |
| Control 3 | 459 | 427 | 504 | 507 | 590 | 595 | 590 | 538 | 520 | 538 | 535 | 533 |
| Control 4 | 508 | 590 | 595 | 508 | 590 | 590 | 595 | 600 | 605 | 610 | 610 | 615 |
| Average | 540.75 | 569.75 | 583.50 | 577.25 | 591.25 | 652.00 | 665.50 | 725.25 | 920.50 | 1312.00 | 699.67 | 625.00 |
| SD | 119.31 | 87.87 | 48.42 | 113.71 | 44.92 | 59.90 | 78.44 | 175.75 | 486.77 | 1121.12 | 182.43 | 79.52 |

TABLE 9

Measured lactate during EVLP experiments

Test Lactate (mM)

| Time | 0 | 1 | 2 | 3 | 4 | 5 | 6 | 7 | 8 | 9 | 10 | 11 |
|---|---|---|---|---|---|---|---|---|---|---|---|---|
| Test1 | 0.2 | 0.6 | 1.1 | 1.5 | 2.1 | 2.6 | 3.3 | 3.9 | 3.8 | 4 | 4.6 | 5.1 |
| Test2 | 0.3 | 0.9 | 1.3 | 1.7 | 2.3 | 2.6 | 3 | 3 | 3.3 | 3.7 | 4 | 4.2 |
| Test3 | 0.2 | 0.6 | 0.9 | 1.4 | 1.8 | 2.2 | 2.3 | 2.7 | 3.1 | 3.5 | 3.8 | 4.1 |
| Test4 | 0.9 | 0.8 | 1.2 | 1.9 | 2.7 | 3.4 | 4.2 | 4.3 | 4.9 | 5.6 | 6.2 | 6.6 |
| Average | 0.4 | 0.725 | 1.125 | 1.625 | 2.225 | 2.7 | 3.175 | 3.475 | 3.775 | 4.2 | 4.65 | 5 |
| SD | 0.29 | 0.13 | 0.15 | 0.19 | 0.33 | 0.44 | 0.69 | 0.65 | 0.70 | 0.83 | 0.94 | 1.00 |

Control Lactate (mM)

| Time | 0 | 1 | 2 | 3 | 4 | 5 | 6 | 7 | 8 | 9 | 10 | 11 |
|---|---|---|---|---|---|---|---|---|---|---|---|---|
| Control1 | 0.4 | 1.8 | 3.5 | 5 | 6.7 | 8.1 | 7.9 | 9.1 | 9.6 | 9.5 | | |
| Control2 | 0.3 | 0.9 | 1.6 | 2.3 | 3.1 | 3.9 | 4.1 | 4.7 | 5.3 | 6.1 | 6.6 | 6.9 |
| Control3 | 0.2 | 0.9 | 1.5 | 2 | 2.8 | 3 | 3.3 | 4 | 4 | 4.1 | 4.5 | 4.7 |
| Control4 | 0.3 | 0.9 | 1.4 | 2 | 2.7 | 3.4 | 3.7 | 4.5 | 5.1 | 5.8 | 6.4 | 7 |
| Average | 0.30 | 1.13 | 2.00 | 2.83 | 3.83 | 4.60 | 4.75 | 5.58 | 6.00 | 6.38 | 5.83 | 6.20 |
| SD | 0.07 | 0.39 | 0.87 | 1.26 | 1.67 | 2.05 | 1.84 | 2.05 | 2.14 | 1.96 | 0.95 | 1.06 |

Example 3

A randomized pig EVLP model followed by transplantation was performed. In this study the lungs were preserved for 24 hours in Perfadex Plus solution, before they were placed on EVLP for four hours and then transplanted for six hours before the experiments were terminated. The transplantation model included transplantation of the left lung with subsequent removal of the right lung to make the pig dependent on only the transplanted lung.

The EVLPs were performed with perfusates as described above, with Test solution 2. The warm-up phase on EVLP was done according to the Toronto protocol with low flow, maximum 40% of estimated cardiac output. After one hour of warm-up, the perfusate was exchanged and the leucocyte filter was clamped off. The clamp of time was denoted time 0. The lungs were maintained for two hours on EVLP using physiological pulmonary artery pressure (also termed PAP) to control the perfusion. As the perfusion was pressure-controlled, not flow controlled, the flow became instead variable. After two hours of warm perfusion, the lungs were cooled down on the machine to about 22° C., maintaining the pressure control of the system. Four cases were done with each perfusate, i.e. four sets of pig's lungs were used with the control, and four with the test solution. One test EVLP had technical issues with the pressure sensors, that made pressure control impossible during a large section of the procedure. This case is therefore only included in the transplantation part that was performed according to protocol.

Figure 5:
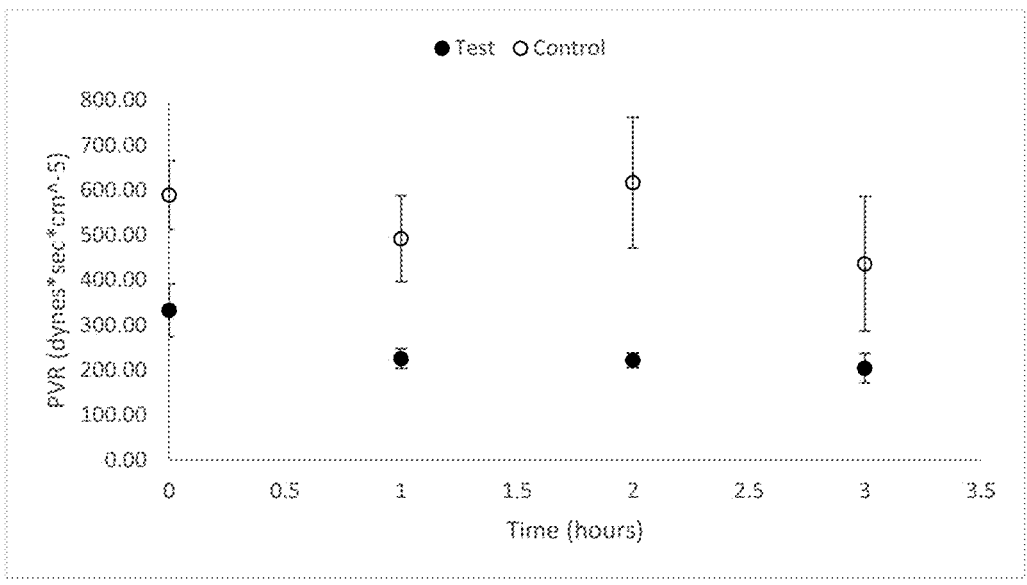
FIG. 5 shows measured PVR during EVLP experiments.
Figure 6:
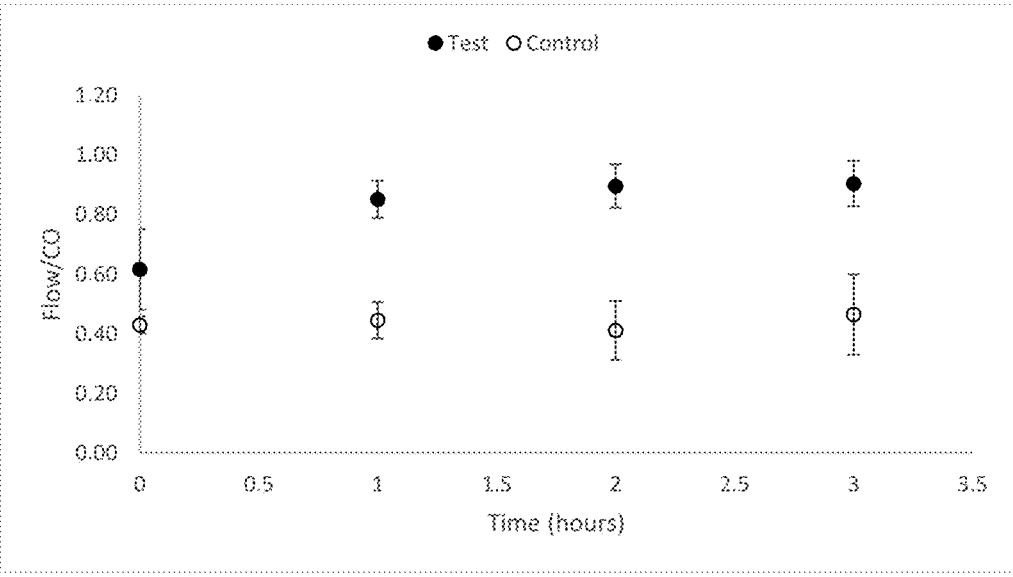
FIG. 6 shows measured (flow/estimated cardiac output) during EVLP experiments.
Figure 7:
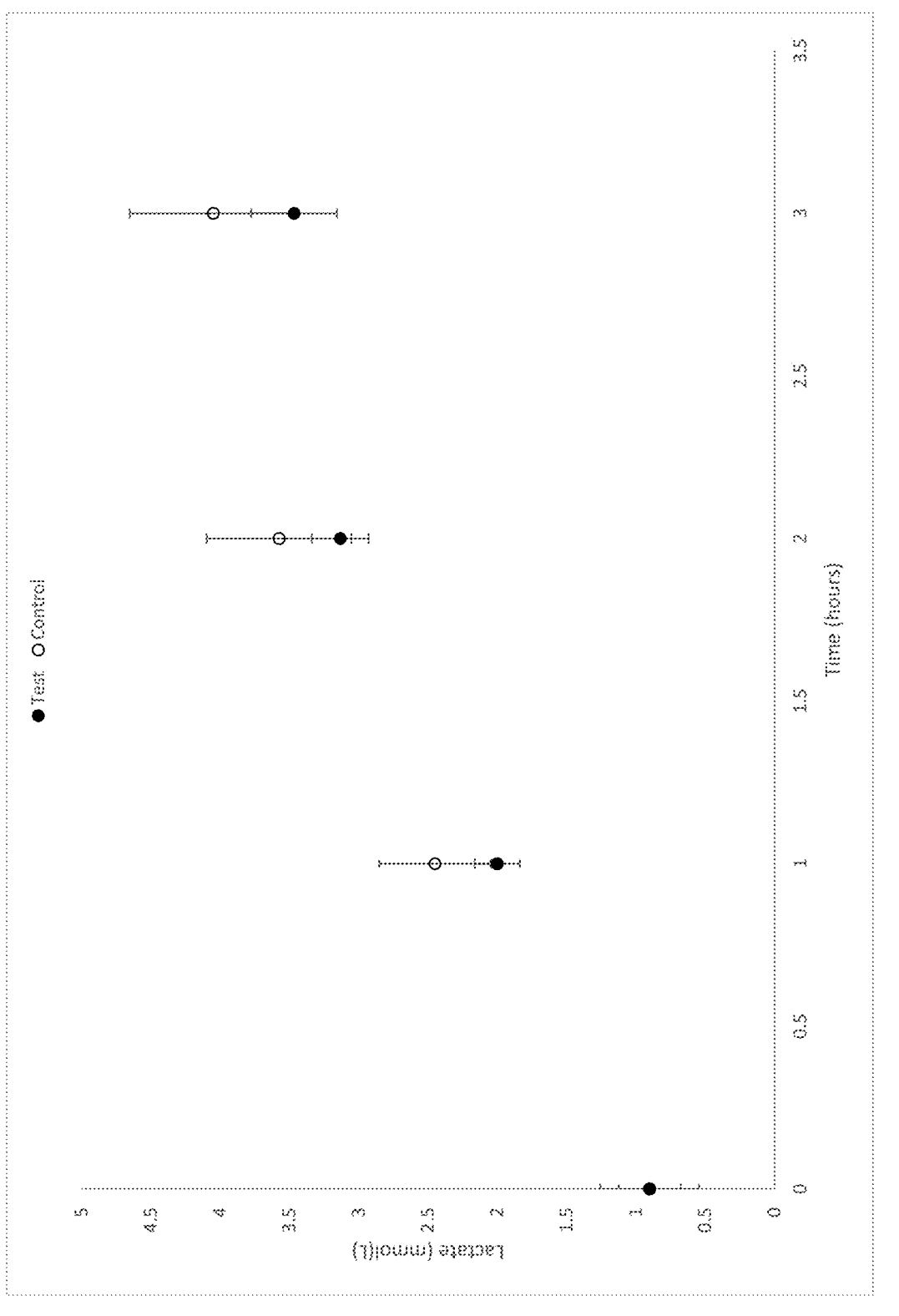
FIG. 7 shows measured lactate during EVLP experiments.
Figure 8:
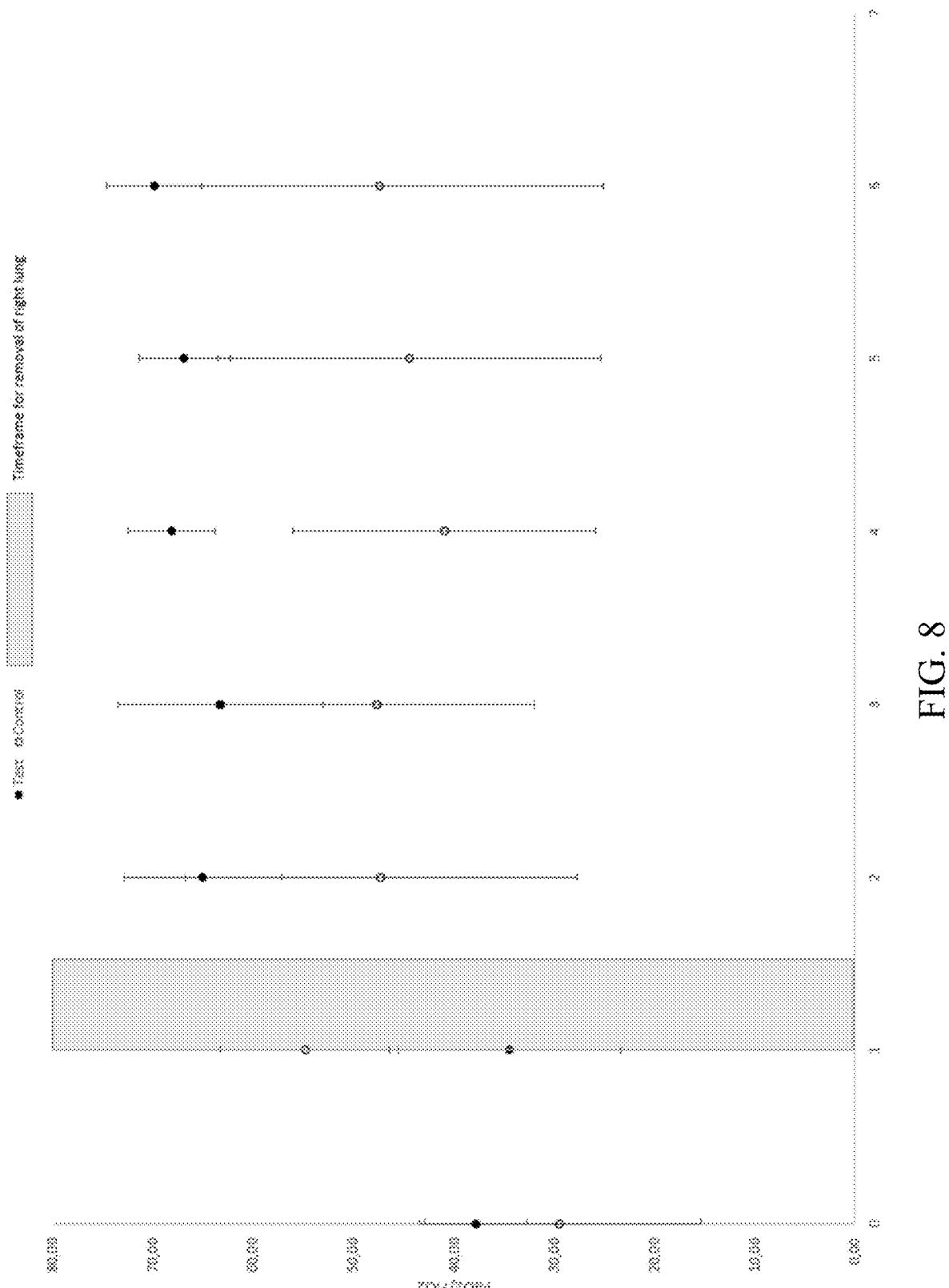
FIG. 8 shows measured PaO2/FiO2 post transplantation.

The results are summarised in FIG. 5 and Table 10 which show measured PVR during EVLP experiments, FIG. 6 and Table 11 which show measured flow per estimated cardiac output during EVLP experiments, FIG. 7 and Table 12 which show measured lactate during EVLP experiments, and FIG. 8 and Table 13 which show measured PaO2/FiO2 post transplantation. The grey zone in FIG. 8 indicates the period of time in which the right lung was removed as this time varied slightly between cases. As above, since these experiments were done later in the year than Example 1, the pig's health was generally better, which is reflected, for example, in lower PVR values.

TABLE 10

Measured PVR during EVLP experiments

| Time | 0 | 1 | 2 | 3 |
|---|---|---|---|---|
| | Test PVR (dynes*sec*cm^-5) | | | |
| Test1 | 256 | 242 | 242 | 243 |
| Test2 | 345 | 240 | 221 | 207 |

TABLE 10-continued

Measured PVR during EVLP experiments

| Time | 0 | 1 | 2 | 3 |
|---|---|---|---|---|
| Test4 | 398 | 195 | 203 | 163 |
| Average | 333.00 | 225.67 | 222.00 | 204.33 |
| SD | 58.59 | 21.70 | 15.94 | 32.71 |
| Control PVR (dynes*sec*cm^−5) | | | | |
| Control1 | 683 | 603 | 762 | 660 |
| Control2 | 494 | 348 | 409 | 241 |
| Control3 | 642 | 547 | 553 | 444 |
| Control4 | 537 | 471 | 743 | 400 |
| Average | 589.00 | 492.25 | 616.75 | 436.25 |
| SD | 76.44 | 95.55 | 145.14 | 149.63 |

TABLE 11

Measured flow divided by estimated cardiac output at rest, during EVLP experiments

| Time | 0 | 1 | 2 | 3 |
|---|---|---|---|---|
| Test flow/estimated CO (l/min/l/min) | | | | |
| Test1 | 0.79 | 0.83 | 0.84 | 0.81 |
| Test2 | 0.60 | 0.79 | 0.85 | 0.91 |
| Test4 | 0.46 | 0.93 | 1.00 | 0.99 |
| Average | 0.62 | 0.85 | 0.90 | 0.90 |
| SD | 0.13 | 0.06 | 0.07 | 0.08 |
| Control flow/estimated CO (l/min/l/min) | | | | |
| Control1 | 0.42 | 0.37 | 0.32 | 0.24 |
| Control2 | 0.48 | 0.54 | 0.57 | 0.61 |
| Control3 | 0.42 | 0.42 | 0.42 | 0.52 |
| Control4 | 0.40 | 0.46 | 0.34 | 0.49 |
| Average | 0.43 | 0.45 | 0.41 | 0.46 |
| SD | 0.03 | 0.06 | 0.10 | 0.13 |

TABLE 12

Measured lactate during EVLP experiments

| Time | 0 | 1 | 2 | 3 |
|---|---|---|---|---|
| Test Lactate (mM) | | | | |
| Test1 | 1.4 | 2.2 | 3.4 | 3.9 |
| Test2 | 0.6 | 1.8 | 2.9 | 3.2 |
| Test4 | 0.7 | 2 | 3.1 | 3.3 |
| Average | 0.9 | 2 | 3.13 | 3.47 |
| SD | 0.36 | 0.16 | 0.21 | 0.31 |
| Control Lactate (mM) | | | | |
| Control1 | 1.2 | 3.1 | 4.4 | 5 |
| Control2 | 0.6 | 2 | 3 | 3.4 |
| Control3 | 0.8 | 2.3 | 3.3 | 3.7 |
| Control4 | 1 | 2.4 | 3.6 | 4.1 |
| Average | 0.90 | 2.45 | 3.58 | 4.05 |
| SD | 0.22 | 0.40 | 0.52 | 0.60 |

TABLE 13

Measured PaO2/FiO2 post transplantation

PaO2/FiO2 test (kPa)

| Time | 0 | 1 | 2 | 3 | 4 | 5 | 6 |
|---|---|---|---|---|---|---|---|
| Test1 | 28.95 | 41.32 | 60.40 | 58.98 | 66.53 | 61.22 | 73.47 |
| Test2 | 40.40 | 25.40 | 74.29 | 78.16 | 75.51 | 72.65 | 64.29 |
| Test3 | 41.43 | 49.00 | 70.60 | 65.80 | 64.40 | 63.80 | 66.20 |
| Test4 | 40.4 | 22.10 | 54.71 | 50.2 | 66 | 69.6 | 75.6 |

TABLE 13-continued

Measured PaO2/FiO2 post transplantation

| | 0 | 1 | 2 | 3 | 4 | 5 | 6 |
|---|---|---|---|---|---|---|---|
| Average | 37.79 | 34.45 | 65.00 | 63.29 | 68.11 | 66.82 | 69.89 |
| SD | 5.12 | 11.11 | 7.82 | 10.22 | 4.34 | 4.53 | 4.76 |

PaO2/FiO2 control (KPa)

| Time | 0 | 1 | 2 | 3 | 4 | 5 | 6 |
|---|---|---|---|---|---|---|---|
| Control1 | 26.20 | 47.20 | 20.10 | 42.65 | 42.24 | 40.00 | 38.98 |
| Control2 | 19.8 | 46.4 | 67.86 | 58.6 | 41.8 | 57.2 | 66.4 |
| Control3 | 53.2 | 66.5 | 63.6 | 64.8 | 61 | 65 | 69.8 |
| Control4 | 18.5 | 59.1 | 37.35 | 24.29 | 18.46 | 15.3 | 14.6 |
| Average | 29.43 | 54.80 | 47.23 | 47.58 | 40.88 | 44.38 | 47.44 |
| SD | 14.03 | 8.42 | 19.54 | 15.69 | 15.08 | 19.07 | 22.41 |

FIGS. 5 to 8 show that a perfusate according to the present invention demonstrates significantly reduced PVR and allows for increased flow at physiological pulmonary artery pressure (PAP). The results also show that the increased flow does not negatively affect the outcomes after transplantation and removal of the remaining native lung. As was seen in Example 2, all lungs perfused with a perfusate according to the invention were more stable as they had less variation in the results compared to the control group. This was also true for initial PaO2/FiO2 upon transplantation, indicating safety and possibly improvement of post-transplantation outcomes. A PaO2/FiO2 between 55 and 65 KPa is considered normal value at sea level. All animals in the test group provided normal PaO2/FiO2 values of above 55 KPa, whereas only two of the control animals did.

Accordingly, the Examples clearly demonstrate that using acetylated serum albumin as in Test solution 1 alone, and in combination with serum albumin loaded with other compounds as in Test solution 2, leads to improved results in terms of reduced PVR and allows for increased flow without negatively affecting outcome, compared to a similar solution where the serum albumin has not been acetylated or loaded. As is shown in FIG. 1, Test solution 1 provides reduced PVR on its own, although the effect is further elevated and prolonged when Test solution 2 is used, indicating that further improvement could be done by additional loading of the serum albumin.

The stabilizing effect on the vascular endothelium through use of the acetylated serum albumin in a perfusion solution is clearly demonstrated, as out of the eight lungs perfused with perfusion solution comprising acetylated serum albumin during the randomized experiments, none has deteriorated during EVLP, whereas three of the eight lungs in the non-acetylated group deteriorated during EVLP. This indicates that also less optimal lungs are more stable on EVLP when an acetylated serum albumin perfusion solution is used.

Prolonged EVLPs have been achieved previously utilizing STEEN Solution (Cypel et al 2008) in a porcine model. It is difficult, however, to compare results from different studies. The health of the pigs is different between breeders, and seasonal changes of pig health is also an important factor. This could for example be visualised as the differences in measured PVR during the three different Examples. The first set of experiments, in Example 1, were done during winter-time, when the general pig health is the worst. The second set of experiments, in Example 2, were done during spring-time, when the general pig health improved from week to week. One experiment from each group was done each week. The test group remained consistent over the four weeks, whereas the first two experiments in the control group did not sustain the prolonged EVLP and had increased PVR resulting in oedema. The third set of experiments, in Example 3, were done early summer, when the general pig health was even further improved and therefore an extended cold ischemic time of 24 h was used in an attempt to provoke the lungs.

In Example 3, the lungs were transplanted after 24 h in cold ischemia and after 4 hours of EVLP in a left lung transplantation with subsequent right lung removal model This is the most stringent transplantation model. All lungs that had been treated with the Test Solution, achieved normal blood gases of PaO2/FiO2≥55 KPa within four hours after transplantation or about 2 hours after removal of the right lung, whereas only two of the control lungs reached PaO2/FiO2≥55 KPa within the six hours of reperfusion in the recipient after removal of the right lung. Together with the data from example 2, where two of the lungs did not sustain the prolonged EVLP without increasing PVR and subsequent development of oedema, half of the lungs in the control group were inferior, whereas all lungs in the test group provide excellent results, indicating that a solution of the present invention provides improved outcomes of EVLP compared to a standard solution used in the prior art and that it might also provide improved post-transplantation outcomes.

The invention claimed is:

1. A method of use of an organ preservation and/or perfusion solution in isolated organ or tissue perfusion comprising a step of perfusing an isolated organ or tissue with the organ preservation and/or perfusion solution, wherein:

the organ preservation and/or perfusion solution comprises acetylated serum albumin and glucose; and the acetylated serum albumin has been formed by acetylation of serum albumin with acetylsalicylic acid with incubation in vitro for at least 12 hours.

2. The method of use according to claim 1, wherein the isolated organ is circulatorily isolated in vivo or is circulatorily isolated ex vivo.

3. The method of use according to claim 1, wherein the isolated organ is a lung or lungs, a heart, a kidney, a liver, a pancreas, intestines or a limb or limbs.

4. The method of use according to claim 1, wherein if the organ is transplanted, it is not transplanted into the body from which it came.

5. The method of use according to claim 1, wherein the step of perfusing the isolated organ or tissue with the organ preservation and/or perfusion solution protects the vascular endothelium and/or reduces vascular resistance.

6. The method of use according to claim 1, wherein the organ preservation and/or perfusion solution is sterilized.

7. The method of use according to claim 1, wherein the serum albumin has also been loaded with a compound that binds to or reacts with the serum albumin, wherein the compound is selected from: a fatty acid molecule; a fat soluble vitamin; an antioxidant; a hormone; a trace element; a pharmaceutical; an NO donor; or combinations thereof.

8. The method of use according to claim 7, wherein the compound that binds to or reacts with the serum albumin is:

a fatty acid which is a nitroalkene derivative of oleic acid, 1-palmitoyl-2-arachidonoyl-sn-glycero-3-phosphoryl-choline (OxPAPC) or sphingosine-1-phosphate (S1P);

a fat soluble vitamin which is retinoic acid (vitamin A), cholecalciferol (vitamin D3), alpha-tocopherol (vitamin E) or vitamin K;

a hydrophobic pharmaceutical which is a thrombin inhibitor;

an antioxidant which is 2-mercaptopropionylglycine (MPG) or glutathione;

a hormone, which is cortisone, prednisolone, triiodothyronine, melatonin or somapacitan;

a trace element which is copper or nickel;

a pharmaceutical which is thrombin, argatroban, or clenbuterol;

an NO donor, which is a thionitrites, S-nitrosoglutathion (GSNO) or arginine; or combinations thereof.

9. The method of use according to claim 1, wherein the serum albumin is a mammalian serum albumin.

10. The method of use according to claim 1, wherein the organ preservation and/or perfusion solution also comprises dextran, calcium ions, a buffer, and water.

11. The method of use according to claim 1, wherein the organ preservation and/or perfusion solution has a pH of 6.6 to 7.8.

12. The method of use according to claim 1, wherein the organ preservation solution has a glucose concentration of 5 to 8 nM.

13. The method of use according to claim 1, wherein the serum albumin is purified recombinant serum albumin or is cleaned prior to being mixed with acetylsalicylic acid.

14. The method of use according to claim 1, wherein the molar ratio of serum albumin to acetylsalicylic acid in the organ preservation and/or perfusion solution is between 1:2 and 2:1.

15. The method of use according to claim 1, wherein the organ preservation and/or perfusion solution is ready to use.

16. The method of use according to claim 1, wherein the acetylated serum albumin has been formed by acetylation of serum albumin with acetylsalicylic acid with incubation in vitro for at least 12 hours in the presence of glucose.

17. The method of use according to claim 1, wherein the acetylated serum albumin has been formed by acetylation of serum albumin with acetylsalicylic acid with incubation in vitro for at least 12 hours in the absence of glucose.

18. The method of use according to claim 1, wherein the acetylated serum albumin has been formed by acetylation of serum albumin with acetylsalicylic acid with incubation in vitro for at least 12 hours at 25° C. or at least 24 hours at 2 to 8° C.

* * * * *